(12) United States Patent
Baker

(10) Patent No.: US 9,731,990 B2
(45) Date of Patent: Aug. 15, 2017

(54) SUBMERGED COMBUSTION GLASS MELTING SYSTEMS AND METHODS OF USE

(71) Applicant: JOHNS MANVILLE, Denver, CO (US)

(72) Inventor: John Wayne Baker, Golden, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/785,328

(22) PCT Filed: May 30, 2013

(86) PCT No.: PCT/US2013/043377
§ 371 (c)(1),
(2) Date: Oct. 17, 2015

(87) PCT Pub. No.: WO2014/193388
PCT Pub. Date: Dec. 4, 2014

(65) Prior Publication Data
US 2016/0145135 A1    May 26, 2016

(51) Int. Cl.
*C03B 5/44* (2006.01)
*C03B 5/235* (2006.01)
(Continued)

(52) U.S. Cl.
CPC ............ *C03B 5/2356* (2013.01); *C03B 5/167* (2013.01); *C03B 5/193* (2013.01); *C03B 5/425* (2013.01);
(Continued)

(58) Field of Classification Search
CPC ....... C03B 19/12; C03B 17/064; C03B 11/00; C03B 17/067; C03B 18/14; C03B 19/10;
(Continued)

(56) References Cited

U.S. PATENT DOCUMENTS 1,706,857 A    3/1929   Mathe
2,174,533 A    10/1939  See et al.
(Continued)

FOREIGN PATENT DOCUMENTS

EP    0 181 248 B1    10/1989
EP    1 337 789 B1    12/2004
(Continued)

OTHER PUBLICATIONS

"Glass Technologies—The Legacy of a Successful Public-Private Partnership", 2007, U.S. Department of Energy, pp. 1-32.
(Continued)

*Primary Examiner* — Jodi C Franklin
(74) *Attorney, Agent, or Firm* — Robert D. Touslee

(57) ABSTRACT

Submerged combustion glass manufacturing systems and methods include a melter having a floor, a roof, a wall structure connecting the floor and roof, and one or more submerged combustion burners mounted in the floor, roof, and/or wall structure discharging combustion products including water vapor under a level of material being melted in the melter and create turbulent conditions in the material. The floor, roof, or wall structure may include fluid-cooled refractory material and an optional metallic external shell, or the metallic shell may include coolant passages. One or more conduits drain water condensed from the water vapor from regions of refractory material substantially saturated with the water, and/or from burner supports.

38 Claims, 8 Drawing Sheets

(51) Int. Cl.
  *C03B 5/167* (2006.01)
  *C03B 5/425* (2006.01)
  *C03B 5/193* (2006.01)
  *C03B 5/43* (2006.01)

(52) U.S. Cl.
  CPC .................. *C03B 5/44* (2013.01); *C03B 5/43* (2013.01); *C03B 2211/23* (2013.01); *C03B 2211/60* (2013.01); *C03B 2211/70* (2013.01); *Y02P 40/55* (2015.11)

(58) Field of Classification Search
  CPC ............ C03B 2201/36; C03B 2207/81; C03B 2211/23; C03B 2211/60; C03B 2215/46; C03B 25/025; C03B 35/14; C03B 40/005; C03B 5/44; C03B 2211/70; C03B 5/26; C03B 5/2356; C03B 2211/22; C03B 2211/40; C03B 5/183; C03B 2211/20; C03B 2211/30; C03B 5/193; C03B 5/167; C03B 5/425; C03B 5/43; F23C 3/004; F27B 3/205; F27B 15/14; F27B 1/24; F27D 2009/0002; F27D 9/00
  See application file for complete search history.

(56) References Cited

U.S. PATENT DOCUMENTS

| | | |
|---|---|---|
| 2,118,479 A | 1/1940 | McCaskey |
| 2,269,459 A | 1/1942 | Kleist |
| 2,321,480 A | 6/1943 | Gaskell |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A * | 7/1966 | Marceau ............... C03B 5/2356 122/6 R |
| 3,266,789 A * | 8/1966 | Henry ..................... C03B 5/12 266/141 |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,339,616 A | 9/1967 | Ward, Jr. et al. |
| 3,347,660 A | 10/1967 | Smith et al. |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,097,028 A | 6/1978 | Langhammer |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,413,882 A | 11/1983 | Bailey et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,919,700 A | 4/1990 | Pecoraro et al. |
| 4,927,886 A | 5/1990 | Backderf et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |

(56) References Cited

U.S. PATENT DOCUMENTS

| | | | |
|---|---|---|---|
| 5,405,082 A | 4/1995 | Brown et al. |
| 5,449,286 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Watzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Philippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Philippe et al. |
| 6,071,116 A | 6/2000 | Philippe et al. |
| 6,074,197 A | 6/2000 | Philippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 9,096,453 B2 | 8/2015 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1* | 11/2002 | Jeanvoine ............ C03B 5/225 65/134.5 |
| 2002/0166343 A1 | 11/2002 | LeBlanc |
| 2003/0015000 A1 | 1/2003 | Hayes et al. |
| 2003/0029197 A1* | 2/2003 | Jeanvoine ............ C03B 3/005 65/157 |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdahl |
| 2005/0236747 A1* | 10/2005 | Rue ..................... C03B 5/2356 266/217 |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |

(56) References Cited

U.S. PATENT DOCUMENTS

| | | |
|---|---|---|
| 2007/0246869 A1 | 10/2007 | Rymarchyk et al. |
| 2008/0035078 A1 | 2/2008 | Li |
| 2008/0227615 A1 | 9/2008 | McGinnis et al. |
| 2008/0256981 A1* | 10/2008 | Jacques .................. C03B 3/02 65/19 |
| 2008/0276652 A1* | 11/2008 | Bauer ................ C03B 5/2356 65/454 |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1* | 4/2010 | Cowles .................. F23C 3/004 126/360.1 |
| 2010/0120979 A1 | 5/2010 | Crawford et al. |
| 2010/0143601 A1 | 6/2010 | Hawtof et al. |
| 2010/0173255 A1* | 7/2010 | Reifel .................... B21F 45/00 431/350 |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1* | 4/2011 | Purnode .................. C03B 5/04 65/181 |
| 2011/0107670 A1 | 5/2011 | Galley et al. |
| 2011/0236846 A1* | 9/2011 | Rue ........................ F27B 3/205 432/195 |
| 2011/0308280 A1* | 12/2011 | Huber ...................... C03B 5/04 65/126 |
| 2012/0077135 A1* | 3/2012 | Charbonneau ............ C03B 3/00 432/11 |
| 2012/0122490 A1 | 5/2012 | Khivesara et al. |
| 2012/0132725 A1* | 5/2012 | Dinu ....................... F23D 1/005 239/132.3 |
| 2012/0138271 A1* | 6/2012 | Filzwieser ................ F27B 3/24 165/104.19 |
| 2013/0086944 A1* | 4/2013 | Shock .................... C03B 19/08 65/22 |
| 2013/0086949 A1* | 4/2013 | Charbonneau .......... F23D 14/64 65/134.4 |
| 2013/0086950 A1 | 4/2013 | Huber et al. |
| 2013/0086951 A1* | 4/2013 | Charbonneau .......... C03B 5/202 65/134.9 |
| 2013/0086952 A1* | 4/2013 | Charbonneau .......... C03B 37/06 65/377 |
| 2013/0137051 A1* | 5/2013 | Beyer ..................... C01B 3/36 431/2 |
| 2013/0153547 A1* | 6/2013 | Katsumata ............... C21D 1/09 219/121.58 |
| 2013/0199938 A1* | 8/2013 | Salvador .................. C25C 3/08 205/379 |
| 2013/0283861 A1* | 10/2013 | Mobley ................... C03B 5/167 65/135.1 |
| 2015/0084246 A1* | 3/2015 | Tang ........................ F27D 9/00 266/46 |
| 2016/0068978 A1* | 3/2016 | Sedlak ..................... C25C 3/06 204/246 |

FOREIGN PATENT DOCUMENTS

| | | |
|---|---|---|
| EP | 1 990 321 A1 | 11/2008 |
| EP | 2 133 315 A1 | 12/2009 |
| EP | 1 986 966 B1 | 4/2010 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

\* cited by examiner

SUBMERGED COMBUSTION GLASS MELTING SYSTEMS AND METHODS OF USE

BACKGROUND INFORMATION

Technical Field

The present disclosure relates generally to the field of submerged combustion glass melters and methods of use.

Background Art

Submerged combustion melters (SCM) and their operation may cause excessive water condensate to form due to the combustion process. A portion of the water vapor in flue gases may condense inside of the SCM rather than exit up the exhaust stack. As such, the water condensate may saturate the refractory lining of the combustion region of the SCM, may leech out portions of the refractory materials, may lessen thermal insulation properties of the refractory, and may provide corrosion initiators to the SCM metallic shell and other metallic structures, such as submerged combustion burners. The condensate may find its way, via gravity, to the lowest spots in the SCM, the bottom and side panels, and burner holders.

Refractory is currently secured to the melter structure, and the melter structure is kept cool through the use of cooling passages that pass a coolant therethrough (liquid or gas), as it is not currently practical to allow the SCM structure to run "hot", i.e., above the steam condensation temperature.

It would be an advance in the submerged combustion glass melting art to develop melters and methods of using them that reduce or overcome one or more of these problems.

SUMMARY

In accordance with the present disclosure, submerged combustion melters and methods of use are described that may reduce or overcome one or more problems stemming from condensate production in the SCM.

A first aspect of the disclosure is a submerged combustion glass manufacturing system comprising:

a melter comprising a floor, a roof, a wall structure connecting the floor and roof;

one or more submerged combustion burners mounted in the floor, roof and/or wall structure, the submerged combustion burners configured to discharge combustion products including water vapor under a level of material being melted in the melter and create turbulent conditions in substantially all of the material;

one or more of the floor, roof, and wall structure comprising fluid-cooled refractory material and an optional metallic external shell, the fluid-cooled refractory material comprising one or more coolant passages; and one or more drain conduits configured to drain at least some water condensed from the water vapor from one or more regions of refractory material substantially saturated with water, and/or from substantially concentric burner holders for one or more of the submerged combustion burners.

A second aspect of the disclosure is a submerged combustion glass manufacturing system comprising:

a melter comprising a floor, a roof, a wall structure connecting the floor and roof;

one or more submerged combustion burners mounted in the floor, roof and/or wall structure, the submerged combustion burners configured to discharge combustion products including water vapor under a level of material being melted in the melter and create turbulent conditions in substantially all of the material, the burners supported by one or more substantially concentric burner holders;

one or more of the floor, roof, and wall structure comprising refractory material and a fluid-cooled external metallic shell, the fluid-cooled external metallic shell comprising one or more coolant passages; and one or more drain conduits configured to drain at least some water condensed from the water vapor from substantially concentric burner holders for one or more of the submerged combustion burners, and/or one or more regions of refractory material substantially saturated with water.

A third aspect of the disclosure is a method of manufacturing glass comprising:

melting glass-forming materials in a submerged combustion melter, the melter comprising a floor, a roof, and a wall structure connecting the floor and roof, one or more of the floor, roof, and wall structure comprising fluid-cooled refractory material and an optional metallic external shell, the fluid-cooled refractory material comprising one or more coolant passages;

combusting a fuel in one or more submerged combustion burners mounted in the floor, roof, and/or wall structure, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products; and draining at least some of the water from the melter.

A fourth aspect of the disclosure is a method of manufacturing glass comprising:

melting glass-forming materials in a submerged combustion melter, the melter comprising a floor, a roof, and a wall structure connecting the floor and roof, one or more of the floor, roof, and wall structure comprising refractory material and a fluid-cooled external metallic shell, the fluid-cooled external metallic shell comprising one or more coolant passages;

combusting a fuel in one or more submerged combustion burners mounted in the floor, roof, and/or wall structure, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products; and draining at least some of the water from the melter.

Systems and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1A:
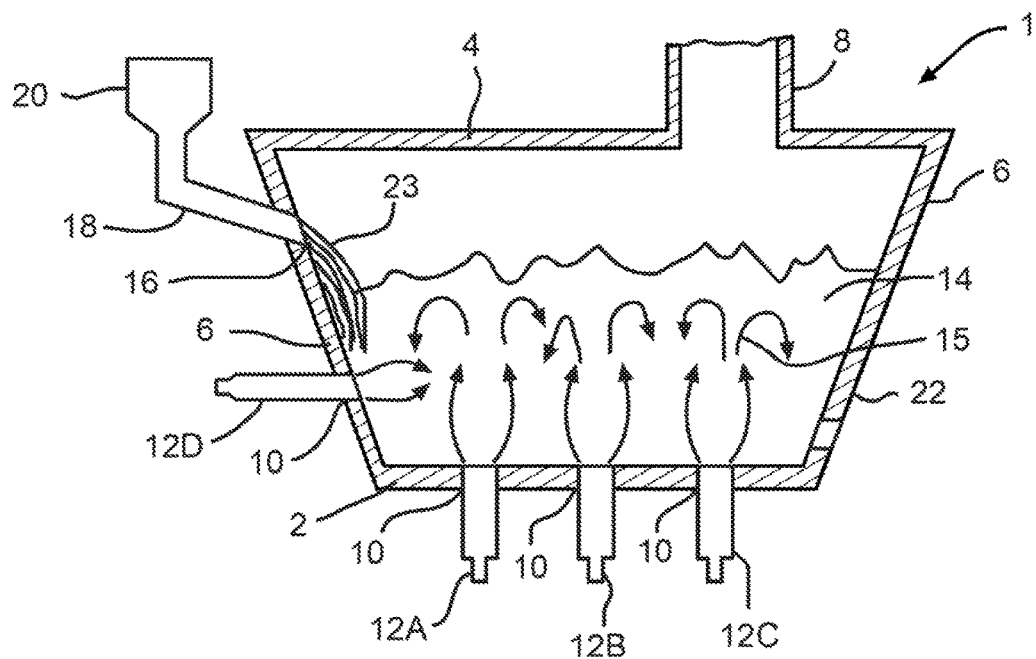
FIG. 1A is a schematic side-elevation view, partially in cross-section, of a prior art submerged combustion melter and system.

It is to be noted, however, that FIGS. 1-8 of the appended drawings may not be to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods of using the systems to produce molten glass. However, it will be understood by those skilled in the art that the systems and methods may be practiced without these details and that numerous variations or modifications from the specifically described embodiments may be possible and are deemed within the claims or claimable subject matter in this or subsequent patents. All United States (U.S.) published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, current production of glass products using submerged combustion may cause excessive water condensate to form due to the combustion process. A portion of the water vapor in flue gases may condense inside of the SCM rather than exit up the exhaust stack. As such, the condensate may saturate portions or all of the refractory lining of the combustion region of the SCM, may leech out portions of the refractory materials, may lessen thermal insulation properties of the refractory, and may provide corrosion initiators to the SCM metallic shell and other metallic structures, such as submerged combustion burners and burner supports. The water condensate may find its way, via gravity, to the lowest spots in the SCM, the bottom and side panels, and burner holders.

Applicant has discovered that by draining water condensate away from the refractory and/or the burner supports or holders, many of the above problems may be reduced or eliminated, resulting in increased refractory and melter shell life and/or increased thermal insulation of the melter.

Various terms are used throughout this disclosure. "Submerged" as used herein means that combustion gases emanate from burners under the level of the molten glass; the burners may be floor-mounted, roof-mounted, wall-mounted, or in melter embodiments comprising more than one submerged combustion burner, any combination thereof (for example, two floor mounted burners and one wall mounted burner).

As used herein the terms "combustion gases", "combustion products" and "combustion flames" may be used interchangeably and mean substantially gaseous mixtures of any excess oxidant or fuel, oxides of carbon (such as carbon monoxide, carbon dioxide), oxides of nitrogen, oxides of sulfur, and water. Combustion products may include liquids and solids, for example soot and unburned liquid fuels. "Exhaust material" includes all materials exiting the melter through an exhaust structure or stack, and includes combustion gases, batch and/or cullet carryover, ejected molten glass, inspirated air, and the like.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of non-fuels therein, including oxidants, for purposes such as premixing the fuel with the oxidant, or atomizing liquid fuels. As used herein the term "fuel" includes gaseous fuels, liquid fuels, flowable solids, such as powdered carbon or particulate material, waste materials, slurries, and mixtures or other combinations thereof. When the fuel comprises gaseous fuel, the gaseous fuel may be selected from the group consisting of methane, natural gas, liquefied natural gas, propane, carbon monoxide, hydrogen, steam-reformed natural gas, atomized oil or mixtures thereof.

"Oxidant" means air, or compositions comprising the same molar concentration of oxygen as air, while the term "oxygen" means a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by an adsorption process or membrane permeation process (about 90% vol. oxygen or more). In all embodiments of the disclosure the sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "substantially saturated" with water, in reference to the refractory material, includes embodiments wherein the refractory material is partially saturated, embodiments wherein the refractory is fully saturated, and embodiments wherein the refractory material is super-saturated, where water is pooling and present in such amount that it is not able to be soaked up by the refractory. Not all of the refractory material needs to be water saturated or even wet; those areas or regions that are lowest in any given melter floor structure, as explained more fully herein, will be most likely to be fully water saturated unless appropriate structural precautions are taken in accordance with the present disclosure. In any given refractory area or region, the refractory may be dry, partially saturated, fully saturated, or super-saturated, that is, "partially saturated" means the refractory could hold more water.

The term "substantially concentric burner holders" for one or more of the submerged combustion burners means burner holders that generally have substantially the same shape of their corresponding burner, so that an annulus or other volume exists between the outer surface of the burner body and the inner surface of the burner holder where liquid water may accumulate unless drained.

Floors, roofs, and/or wall structures of submerged combustion melters useful in methods and systems of the present disclosure may be comprised of metal, ceramic, ceramic-lined metal, or combination thereof. Suitable metals for metallic shells include stainless steels, for example, but not limited to, 306 and 316 steel, as well as titanium alloys, aluminum alloys, carbon steel, and the like. These same metallic materials may be used for burner supports (also referred to herein as burner holders), burner bodies, drain conduits, and other components not exposed to the molten glass. Submerged combustion burner tips often comprise noble metals, such as platinum/rhodium alloys, or copper alloys, and shapes designed to reduce stress and thermal fatigue, as described more fully in Applicant's pending International Application Number PCT/US13/42159, filed May 22, 2013, and Applicant's pending International Application Number PCT/US13/42153, filed May 22, 2013.

In certain systems of the present disclosure one or more of the drain conduits may comprise a valve, which may be manually or automatically operated. If automatically operated, the valve may be controlled by one or more control loops, for example, including a moisture sensor deployed in the refractory near where water condensate accumulates or is suspected of accumulating. In other embodiments, the automatic valve may operate on a simple timer. Such sensors may also be employed in conjunction with manually operated valves, for example, through use of audible or visual alarms alerting a human operator to manually open one or more drain valves.

Certain systems of the present disclosure may include sloped melter floors, where a portion or portions of the melter floor is sloped downward toward a water condensate drain, for example, toward one or more burner holders where the burner holders are at a low point or points in the melter floor and have drain conduits. In other embodiments, the melter floor may be sloped away from burner holders, toward a low point or points in the melter floor. In yet other embodiments, both strategies may be employed.

Certain systems and methods of the present disclosure may employ drain channels, either in conjunction with drain conduits or without drain conduits, in the refractory or built into the metallic shell of the melter, as further explained herein.

In certain systems and methods the submerged combustion burners may be configured to discharge combustion products primarily non-laterally under the level of material being melted in the melter, as long as this does not substantially damage the floor, roof, or walls of the melter or other components. In certain exemplary system and method embodiments the submerged combustion burners may be configured to discharge combustion products primarily vertically under the level of material being melted in the melter.

In certain systems the wall structure may comprise a feed end wall, an exit end wall, and two side walls, with each side wall connected to both the feed end wall and the exit end wall.

Referring now to the drawing figures, FIG. 1A is a side-elevation view, partially in cross-section, of a prior art submerged combustion melter system and method embodiment 1, including a melter floor 2, submerged combustion burners 12A, 12B, 12C, and 12D supplying combustion flames through burner ports 10 for each burner, a melter roof 4 and a sidewall structure 6 connecting floor 2 and roof 4, and may a include a sump (not illustrated) for handling material that falls off the inside surfaces of an exhaust stack 8. Prior art melter and system embodiment 1 includes a molten glass exit port 22. A glass-forming material feed bin 20 may be attached to melter sidewall 6 via a conduit 18 and inlet feed port 16, and FIG. 1A illustrates solid batch and/or cullet 23 entering the melter, with a partially molten mass of material 14 indicated. Glass melt 14 in the melter may be generally in a turbulent condition as indicated by flow-indicating arrows 15 in melt 14, caused by combustion products from burners 12, although the melter may have non-turbulent layers, such as when burners are positioned in the sidewalls, and the combustion products discharge laterally. Sidewall structure 6, floor 2, and roof 4 are typically composed of ceramic or other refractory material, while exhaust stack 8 typically is refractory-lined metal, and leads to a metal duct system and baghouse for handling solid particulates that may escape the melter. Prior art system 1 includes various fuel and oxidant flow conduits (not shown) and may include flow meters, such as oxidant flow meters and fuel flow meters. Melt typically discharges into a forehearth (not shown).

Figure 1:
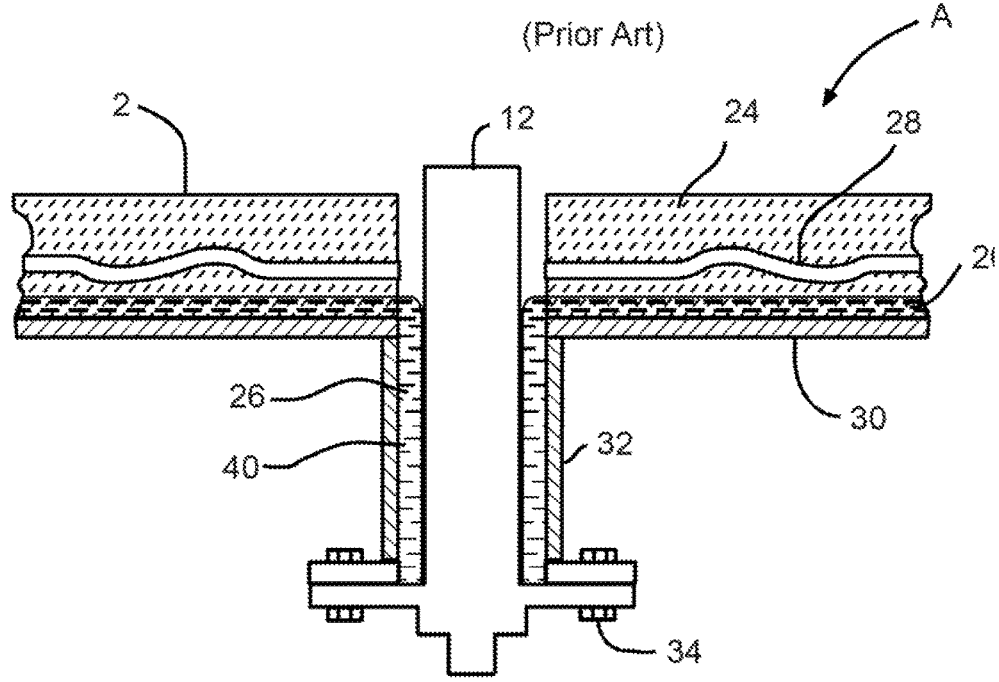
FIGS. 1 and 2 are schematic cross-sectional views of two prior art melter wall structures and burner support arrangements.
Figure 2:
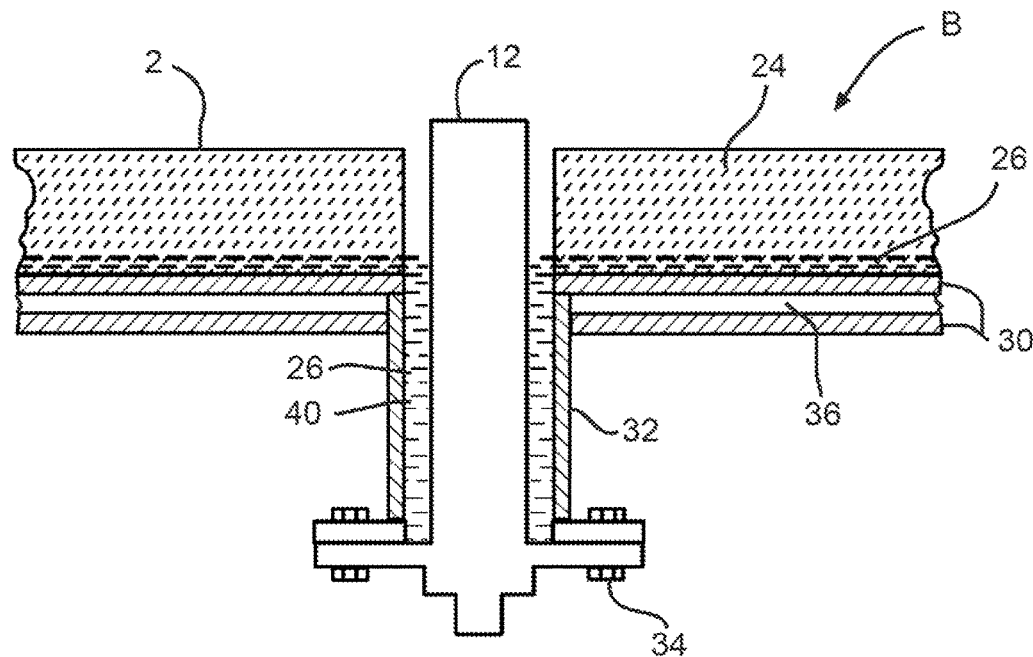
Figure 3:
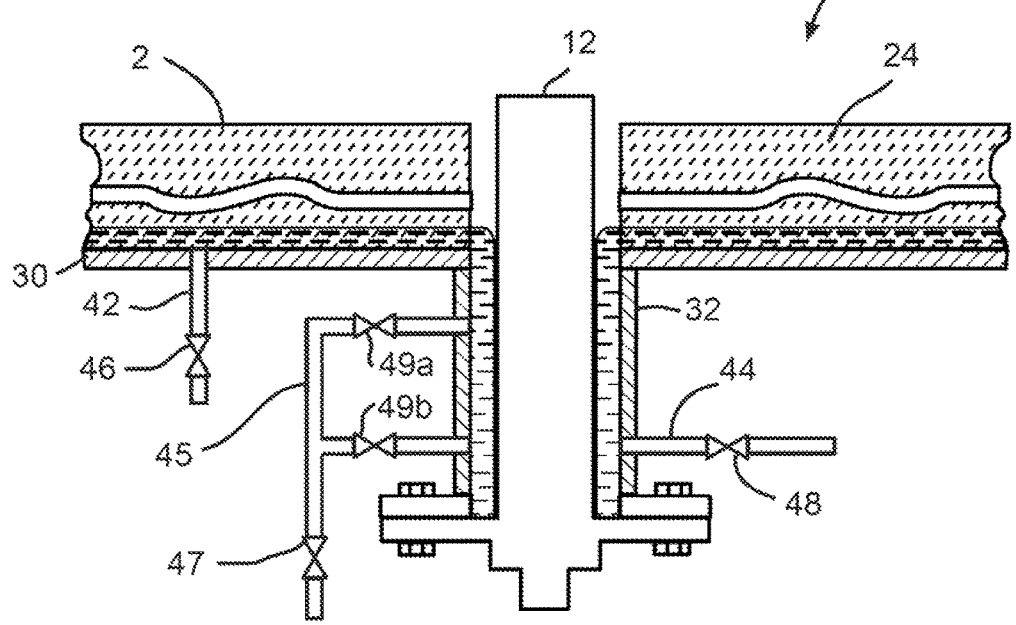
FIGS. 3, 4, 5A, and 6A are schematic cross-sectional views of various embodiments of the present disclosure.

FIGS. 1 and 2 are schematic cross-sectional views of two prior art melter wall structures and burner support arrangements A and B, respectfully. FIG. 1 illustrates embodiment A schematically, including melter floor 2 comprising refractory material 24 and coolant passages 28. Also illustrated is melter metallic shell 30, substantially concentric burner support 32, with burner 12 being bolted to burner support 32 with bolts 34. Water saturated refractory 26 including accumulated water is illustrated schematically in the lower regions of refractory 24, and water 40 is illustrated in the annular region between burner 12 and substantially concentric burner holder 32. FIG. 2 illustrates embodiment B schematically, including melter floor 2 comprising refractory material 24. In embodiment B, coolant passages 36 are in melter metallic shell 30, otherwise embodiment B is substantially similar to embodiment A, including concentric burner support 32, with burner 12 being bolted to burner support 32 with bolts 34. The burner may be secured to the burner support using any method, such as bolts, clamps, threaded connectors, dog connectors, and the like. Water saturated refractory including accumulated water 26 is illustrated schematically in the lower regions of refractory 24, and water 40 is illustrated in the annular region between burner 12 and substantially concentric burner holder 32.

Figure 4:
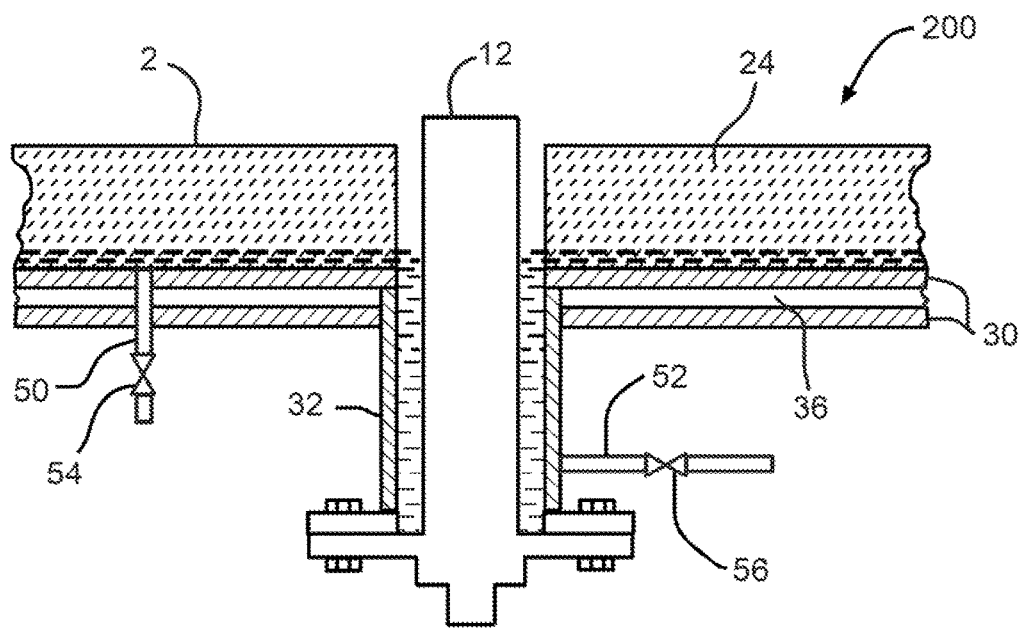

FIGS. 3, 4, 5A, and 6A are schematic cross-sectional views of various embodiments of the present disclosure. Embodiment 100, illustrated schematically in FIG. 3, includes a first drain conduit 42 that drains liquid water from a region of refractory 24 experiencing, or that might experience, saturation. Optionally a second drain conduit 44 may also be provided, functioning to drain liquid water from the annular volume between burner 12 and burner holder 32. Alternatively, embodiments featuring only drain conduit 42, and embodiments including only drain conduit 44 are considered within the scope of embodiment 100. Finally, embodiments including both drain conduits 42 and 44 are considered within the disclosure. Exemplary embodiments include valves 46 and 48, which may either be manual or automatically operated, as alluded to herein. Yet another option is to provide a clear sight tube 45, with a drain valve 47, and connection valves 49a, 49b. This arrangement would allow closing valves 49a, 49b while draining sight tube 45 using drain valve 47. This arrangement may be employed alone or with any of the other embodiments, and allows visual inspection for presence of water in sight tube 45 without opening drain valve 47. Valve 49a may be added so that it may be closed when drain valve 47 is opened to drain water, thereby ensuring the internal pressures in the melter do not push flame or glass into sight tube 45. Using this embodiment water accumulation rate may be visually monitored on a periodic basis without operating any of the valves. The water accumulation rate may be measured and then used to make decisions on operation of the melter and/or to know whether some internal components (such as a melter shell or burner) may have failed and are now leaking into the interior of the melter. FIG. 4 illustrates schematically embodiment 200, which is similar to embodiment 100. In one arrangement, drain conduit 50 is provided, and optionally a second drain conduit 52 as illustrated. Valves 54 and 56 may further be provided, either manually operated or automatically operated.

Figure 5A:
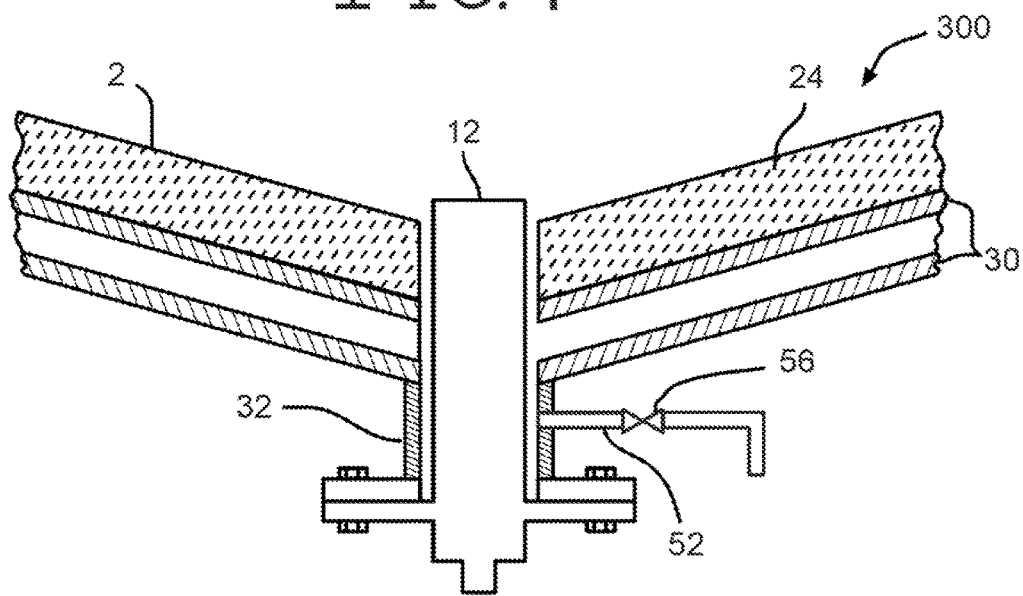
Figure 5B:
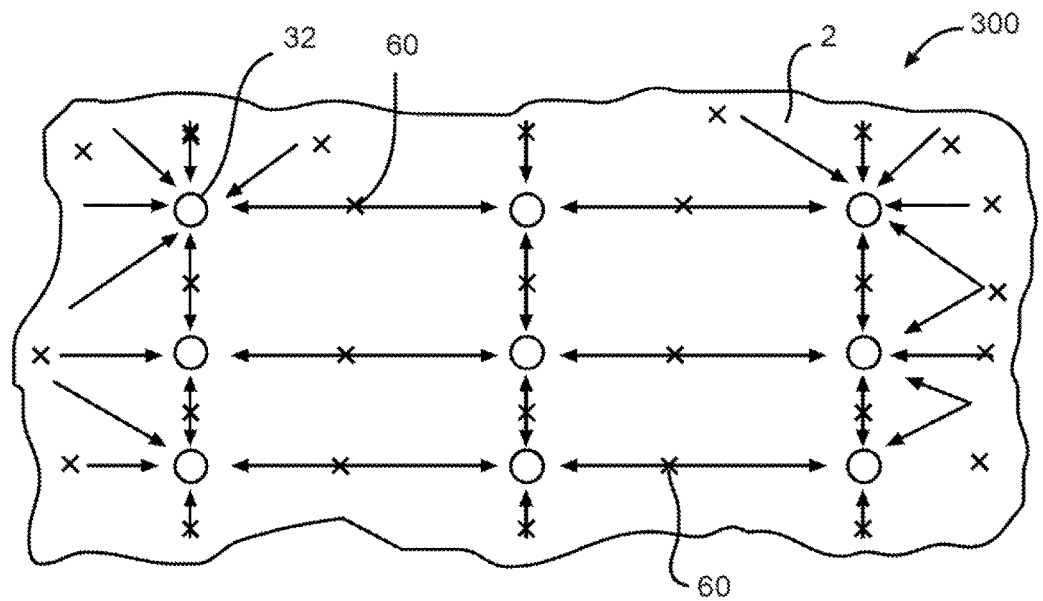
FIGS. 5B and 6B are schematic plan views of portions of melter floors using the embodiments of FIGS. 5A and 6A, respectively.
Figure 6A:
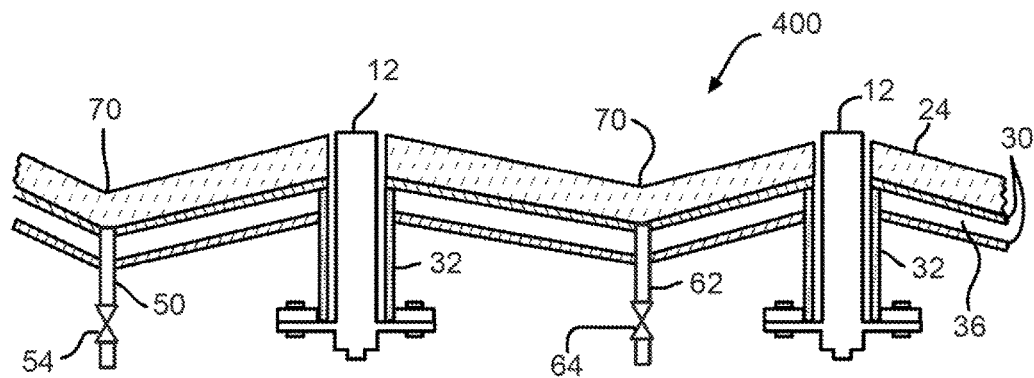

FIGS. 5A and 6A illustrate schematic cross-sections of embodiments 300 and 400, respectively. FIG. 5A illustrates embodiment 300, including a sloping, V-shaped non-horizontal floor portion 2 including sloping refractory 24 and corresponding sloping metallic shell 30 with its cooling passage 36. A drain conduit 52 is provided to drain liquid water out of the region between burner 12 and substantially concentric burner holder 32, and exemplary embodiments may include a manual or automatic drain valve 56. One or more burners 12 in embodiments like embodiment 300 may be strategically positioned where liquid water may accumulate, that is, in low points in melter floor 2. FIG. 5B is a schematic plan view of a portion of melter floor 2 using the concept of embodiment 300 of FIG. 5A, wherein the "X" spots, denoted at 60, are relatively higher areas around relatively low areas where burner holders 32 are positioned, with the arrows indicating direction of drainage of liquid water toward burners holders 32. It will be understood that the "V" shape is only one example of possible melter floor 2 shapes, other shapes, such as smooth curve, stepped patterns, and the like, also considered to be within the scope of embodiment 300. It should be further pointed out that these embodiments may be practiced with the type of construction illustrated schematically in FIG. 3, with embodiment 100.

Figure 6B:
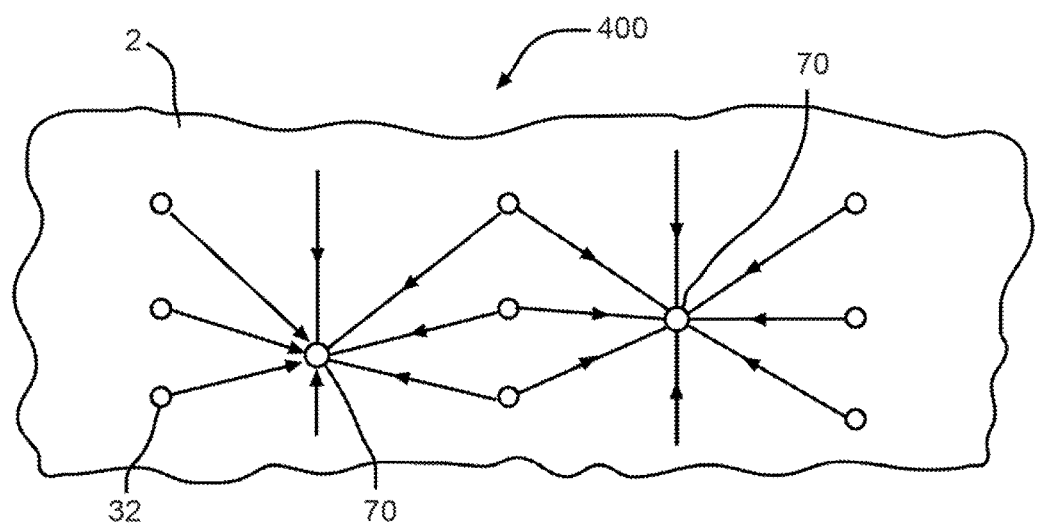

FIG. 6A is a schematic cross-sectional view of another embodiment 400, and FIG. 6B a schematic plan view of portions of a melter floor using embodiment 400 of FIG. 6A. As may clearly be seen in FIG. 6A, portions of melter floor 2 slope downward in non-horizontal V-shaped fashion, meeting at low points 70, where drain conduits 50, 62 may be installed to drain liquid water accumulating there, preferably with respective valves 54, 64. In embodiment 400, one or more drain conduits may also be installed to drain liquid water in burner holders 32. FIG. 6B illustrates, in schematic plan view similar to FIG. 5B, an installation of the concept behind embodiment 400, with arrows indicating the planned drainage path of liquid water toward low points 70. As with embodiment 300, it will be understood that the "V" shape is only one example of possible melter floor 2 shapes, other shapes, such as smooth curve, stepped patterns, and the like, also considered to be within the scope of embodiment 400. It should be further pointed out that these embodiments may be practiced with the type of construction illustrated schematically in FIG. 3, with embodiment 100.

In embodiments 300 and 400, and similar embodiments, drain conduits may be installed in various manners, for example, by drilling holes in metallic shell 30 and threading the holes, by use of welding or brazing, through use of flanges, through the use of interference fittings, and the like, and combinations of these methods well-known in the metal fabrication arts.

Figure 7:
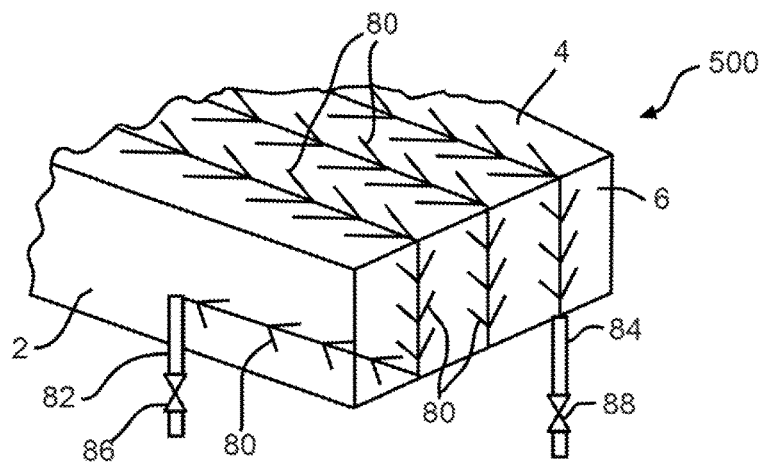
FIG. 7 is a schematic perspective view of a portion of a submerged combustion glass melter in accordance with the present disclosure including drain channels and drain conduits.

FIG. 7 is a schematic perspective view of a portion of a submerged combustion glass melter embodiment 500 in accordance with the present disclosure including a plurality of drain channels 80 directing liquid water toward drain conduits 82, 84, preferably having respective drain valves 86, 88. As illustrated, drain channels 80 may be in melter roof 4, melter wall structure 6, and/or melter floor 2. One drain channel may lead to an edge-positioned drain conduit, as illustrated with drain conduit 84.

Figure 8A:
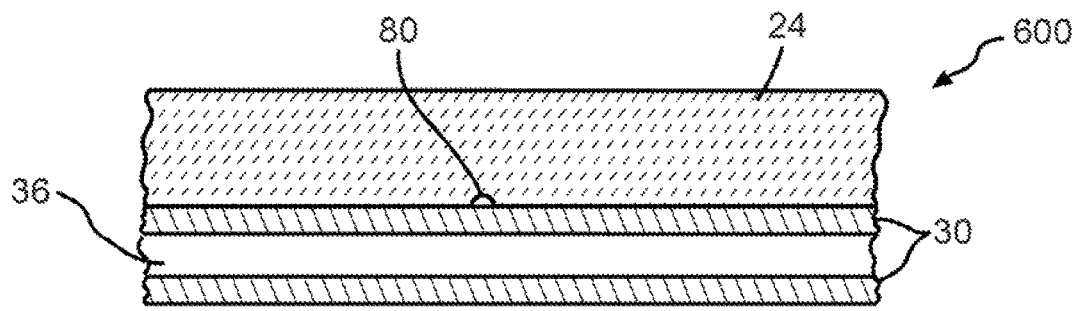
FIGS. 8A, 8B, and 8C are schematic cross-sectional views of drain channel embodiments in accordance with the present disclosure.
Figure 8B:
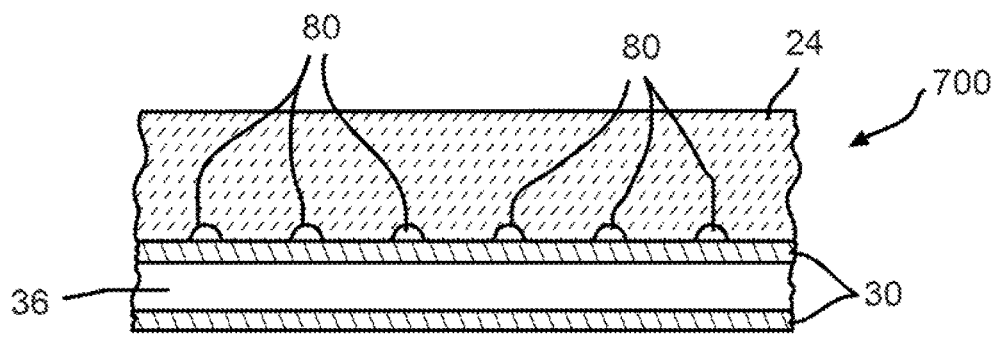
Figure 8C:
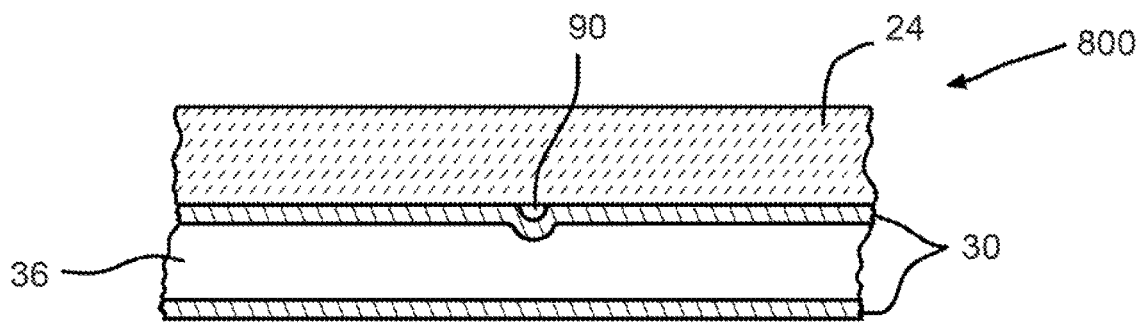

FIGS. 8A, 8B, and 8C are schematic cross-sectional views of drain channel embodiments 600, 700, and 800, respectively, in accordance with the present disclosure such as may be used in system of the present disclosure, including embodiment 500, illustrated schematically in FIG. 7. Embodiment 600 is a single, generally linear channel 80 molded into refractory 24, while embodiment 700 comprises a plurality of such channels 80. In alternate embodiments, channels 80 may be curved, such as S-shaped, and may be randomly or non-randomly positioned. Alternatively, channels 90 may be formed in the metallic shell 30, as illustrated schematically in FIG. 8C. Finally, certain embodiments may use a combination of embodiments 600, 700 and 800. In yet another alternative (not illustrated), small diameter metallic tubing may be used to form channels 80 and/or 90.

Figure 9:
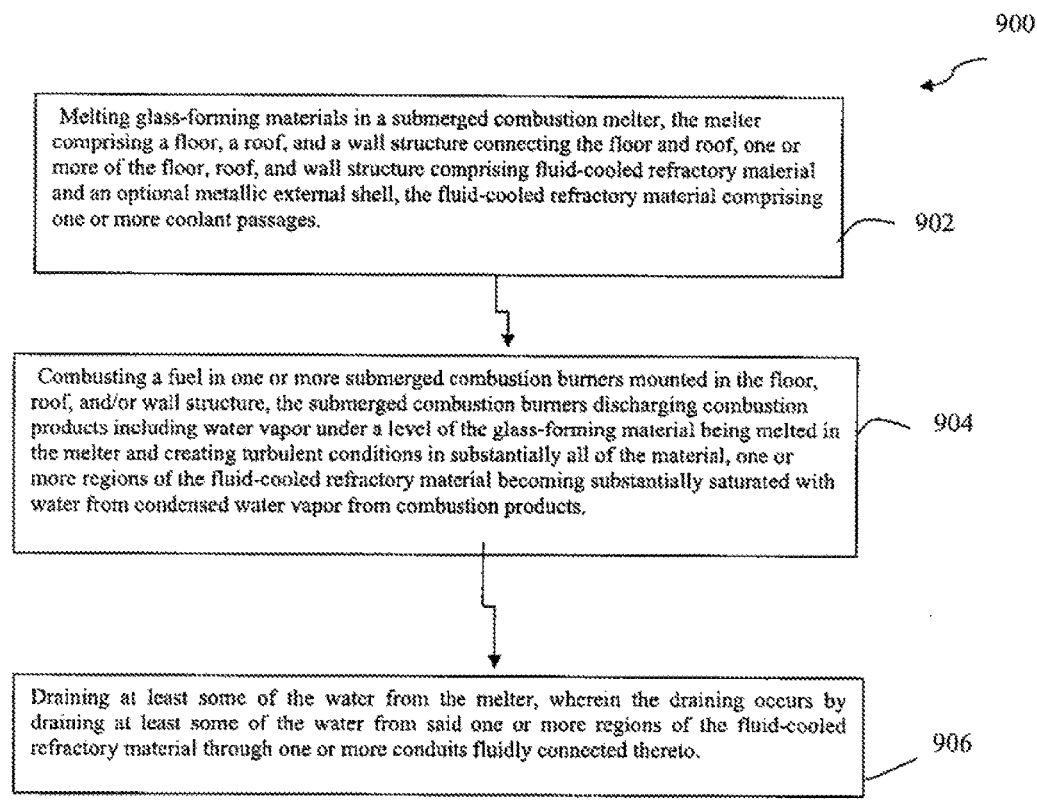
FIGS. 9 and 10 are logic diagrams of two methods in accordance with the present disclosure.
Figure 10:
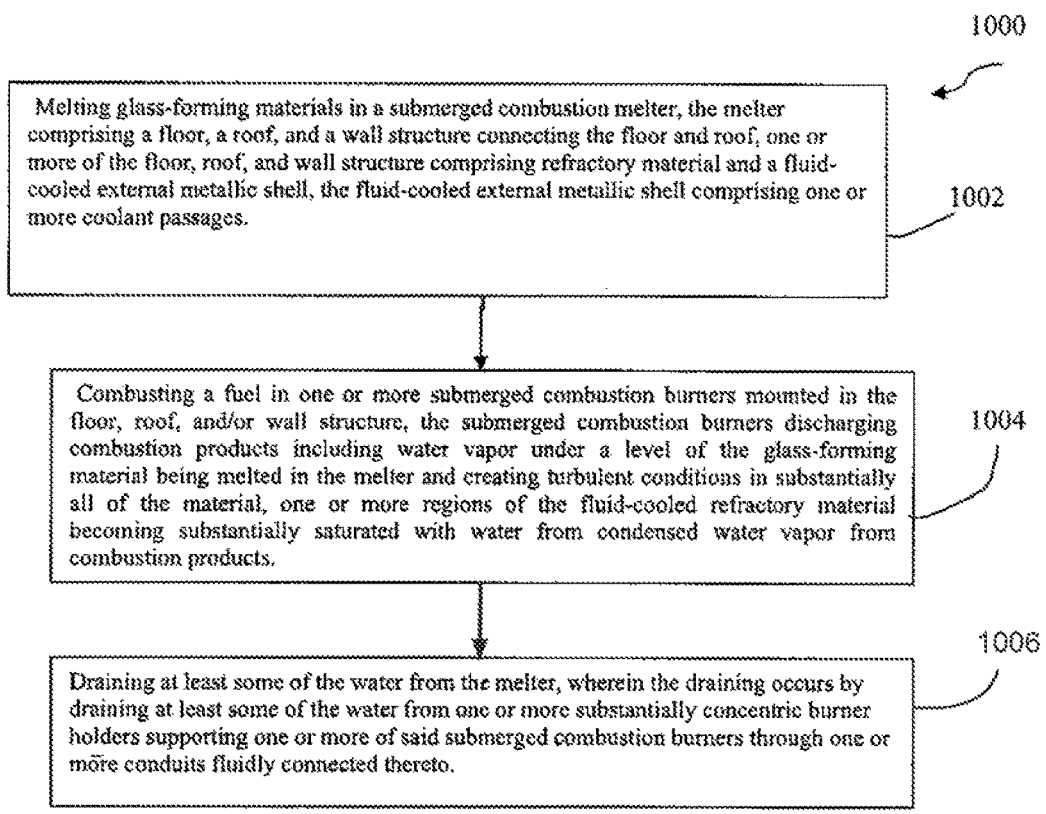

FIGS. 9 and 10 are logic diagrams of two methods in accordance with the present disclosure. Method embodiment 900 includes melting glass-forming materials in a submerged combustion melter, the melter comprising a floor, a roof, and a wall structure connecting the floor and roof, one or more of the floor, roof, and wall structure comprising fluid-cooled refractory material and an optional metallic external shell, the fluid-cooled refractory material comprising one or more coolant passages, box 902. Method embodiment 900 further includes combusting a fuel in one or more submerged combustion burners mounted in the floor, roof, and/or wall structure, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products, box 904. Method embodiment 900 further includes draining at least some of the water from the melter, wherein the draining occurs by draining at least some of the water from said one or more regions of the fluid-cooled refractory material through one or more conduits fluidly connected thereto, box 906.

Method embodiment 1000 includes melting glass-forming materials in a submerged combustion melter, the melter comprising a floor, a roof, and a wall structure connecting the floor and roof, one or more of the floor, roof, and wall structure comprising refractory material and a fluid-cooled external metallic shell, the fluid-cooled external metallic shell comprising one or more coolant passages, box 1002. Method embodiment 1000 further includes combusting a fuel in one or more submerged combustion burners mounted in the floor, roof, and/or wall structure, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products, box 1004. Method embodiment 1000 further includes draining at least some of the water from the melter, wherein the draining occurs by draining at least some of the water from one or more substantially concentric burner holders supporting one or more of said submerged combustion burners through one or more conduits fluidly connected thereto, box 1006.

Many submerged combustion melter designs may benefit from the teachings of the present disclosure, such as those having other feed arrangements, burner arrangements, and wall, roof, and floor designs, such as disclosed in Applicant's co-pending U.S. patent application Ser. No. 12/817,754 filed Jun. 17, 2010 (now U.S. Pat. No. 8,769,992, issued Jul. 8, 2014); Ser. No. 12/888,970 filed Sep. 23, 2010 (now U.S. Pat. No. 8,650,914, issued Feb. 18, 2014); Ser. No. 13/267,990 filed Oct. 7, 2011 (now U.S. Pat. No. 8,997,525, issued Apr. 7, 2015), Ser. No. 13/268,028 filed Oct. 7, 2011 (now U.S. Pat. No. 8,875,544, issued Nov. 4, 2014), Ser. No. 13/268,065 filed Oct. 7, 2011 (now U.S. Pat. No. 8,973,400, issued Mar. 10, 2015), Ser. No. 13/268,130 filed. Oct. 7, 2011 (now U.S. Pat. No. 9,021,838, issued May 5, 2015), and U.S. Pat. No. 7,273,583, all of which are considered within the present disclosure.

Certain system and method embodiments of this disclosure may include submerged combustion melters comprising fluid-cooled panels, such as described in Applicant's co-pending U.S. patent application Ser. No. 12/817,754 filed Jun. 17, 2010 (now U.S. Pat. No. 8,769,992, issued Jul. 8, 2014).

Certain system and method embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and processes of this disclosure may also measure and/or monitor feed rate of batch or other feed materials, such as glass mat or wound roving, mass of glass mat or wound roving per unit length, web or roving linear speed, and combinations thereof, and use these measurements for control purposes. Exemplary systems and methods of the disclosure may comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

Yet other systems and methods may employ a lance above the melt if the melt is foamy and foam is not desired in the submerged combustion melter, as described in Applicant's co-pending U.S. patent application Ser. No. 13/268,130 filed Oct. 7, 2011 (now U.S. Pat. No. 9,021,838, issued May 5, 2015).

SCMs may be fed a variety of feed materials. In SCMs processing glass batch, the initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in Applicant's published U.S. applications 2007/0220922 and 2008/0276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 2007/0220922 application. Notice that during glass melting, carbon dioxide (from lime) and water (borax) evaporate. The initial raw material can be provided in any form such as, for example, relatively small particles.

TABLE 1

Typical E-glass batches

| Raw material | A Limestone (Baseline) | B Quicklime | C Ca Silicate | D Volcanic Glass | E Ca Silicate & Volcanic Glass | F Quartz-free #1 | G Quartz-free #2 | H Limestone/ Slag | I Ca-Silicate/ Slag | J Quartz-free #3 | K Quartz and Clay free | L Ca-Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.0% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 |

SCMs may also be fed by one or more roll stands, which in turn supports one or more rolls of glass mat, as described in Applicant's co-pending U.S. application Ser. No. 12/888,970 filed Sep. 23, 2010, (now U.S. Pat. No. 8,650,914, issued Feb. 18, 2014), incorporated herein by reference. In certain embodiments powered nip rolls may include cutting knives or other cutting components to cut or chop the mat (or roving, in those embodiments processing roving) into smaller length pieces prior to entering the SCM. Also provided in certain embodiments may be a glass batch feeder. Glass batch feeders are well-known in this art and require no further explanation.

The melter dimensions and the number and arrangement of submerged combustion burners may vary, depending on feed composition and product to be produced. Fined glass may be produced, as well as foamed glass. The typical bubble (void) diameter in melt samples may be about 0.1 mm, but with time at temperatures, as is provided by a refractory lined channel or forehearth of varying length and depth, the small bubbles may coalesce and form larger voids that rise in the flowing molten glass and may be removed from the bulk glass. With enough time and temperature, the glass becomes "fined" to the state of a solid glass without voids. If foamed glass is desired, insulating foam glass depends on a significant void fraction to produce a closed cell, light-weight glass that has insulating properties. Glass produced from an SCM of this disclosure may have a significant closed cell void fraction that could be used as an insulating glass panel. Some modifications, such as described in Applicant's co-pending U.S. patent application Ser. No. 13/267,990 filed Oct. 7, 2011 (now U.S. Pat. No. 8,997,525, issued Apr. 7, 2015), may be needed to control void fraction to a higher fraction (percentage) and to increase the average size of the voids from the typical 0.1 mm diameter to 1 mm or more.

Drain conduits and drain channels described herein may be used in retrofitting an existing melter, or in constructing a new system. Drain conduits and drain channels described herein may have a wide variety of cross-sectional shapes, and the cross-sectional shape may be the same or different along the length (flow direction) of drain conduits and drain channels. The cross-sections may be rectangular (including square), round, oval, triangular, U-shaped (ends are U-shaped, with linear connecting walls), quadrangular (for example trapezoidal), hexagonal, octagonal, parabolic, and the like. Drain conduits may be sized using experience or calculation based on the fuel and oxidant used, feed materials, and the like. The diameter of tubing used for drain conduits may range from about 0.25 inch nominal diameter up to about 3 inches nominal diameter or larger if required. Drain channels may have any cross-sectional shape, and may have a diameter ranging from about 0.25 inch to about 3 inches, but in any case less than one half of the thickness of the refractory (if formed in the refractory). Those of skill in the art will be able to easily determine without undue experimentation the best option to use for their particular melter, burner arrangement, feed material, glass product being produced, and the like.

Submerged combustion melters in embodiments described herein, except for the structural modifications detailed herein, may be any of the currently known submerged combustion melter designs, or may be one of those described in Applicant's currently pending U.S. patent application Ser. No. 12/817,754 filed Jun. 17, 2010, (now U.S. Pat. No. 8,769,992, issued Jul. 8, 2014), incorporated herein by reference. Submerged combustion melters useful in the practice of the methods and systems of this disclosure may take any number of forms, including those described in Applicant's co-pending U.S. patent application Ser. No. 12/817,754, (now U.S. Pat. No. 8,769,992, issued Jul. 8, 2014), which describes sidewalls forming an expanding melting zone formed by a first trapezoidal region, and a narrowing melting zone formed by a second trapezoidal region, wherein a common base between the trapezoids defines the location of the maximum width of the melter.

In certain systems and methods, the methods of Applicant's co-pending U.S. patent application Ser. No. 13/268,065 filed Oct. 7, 2011, (now U.S. Pat. No. 8,973,400, issued Mar. 10, 2015) using the vibrations and oscillations of the melter itself, may prove useful predictive control inputs. Measurement of vibration is a well-developed science in its own right and requires little explanation to the skilled vibration sensor artisan. A good summary is provided by Furman, B. J., "*Vibration Measurement*", San Jose State University, Department of Mechanical and Aerospace Engineering, pp. 1-14, 22 Nov. 2005, incorporated herein by reference. Furman described vibration as interchange between potential and kinetic energy in bodies with finite stiffness and mass that arises from time dependent energy input, and gives examples, including fluid flow. Without being limited to any particular theory, the inventors herein theorize that the oxidant and/or fuel fluid flows through submerged combustion burners, and the flames and combustion products emanating from those burners, contribute to the vibration and/or oscillation observed in submerged combustion glass tank furnaces. Basic parameters of vibration study, such as amplitude, amplitude peak level, peak-to-peak amplitude, root-mean-square (RMS) amplitude level, and average (rectified) amplitude, are given schematically in Furman. See also Applicant's co-pending U.S. patent application Ser. No. 13/268,065 (now U.S. Pat. No. 8,973,400, issued Mar. 10, 2015).

Burners useful in the melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and may include one or more adjustable flame submerged combustion burners such as described in Applicant's co-pending U.S. patent application Ser. No. 13/268,028 filed Oct. 7, 2011, (now U.S. Pat. No. 8,875,544, issued Nov. 4, 2014). One useful burner, for example, is described in the Applicant's 544 patent as comprising a first conduit comprising a first end, a second end, a longitudinal bore having a longitudinal axis, and an external surface, and a second conduit substantially concentric with the first conduit. The second conduit comprises a first end, a second end, and an internal surface, and the first and second conduits are configured to form a primary annulus between the external surface of the first conduit and the internal surface of the second conduit. The burners further comprise an adjustable structure comprising a body having an upper surface, a lower surface, a circumferential surface abutting a portion of the internal surface of the second conduit, and a generally cylindrical central hub concentric with the longitudinal axis, the structure adjustable axially in relation to and removably attached to the first end of the first conduit via the hub. The hub defines a central passage having an exit at the upper surface, and the body comprises one or more non-central through passages extending from the lower to the upper surface, the non-central passages configured such that flow of a first fluid through the non-central passages causes the first fluid to intersect a flow of a second fluid in a mixing region above the upper surface of the body.

In certain embodiments the burners may be floor-mounted burners. In certain embodiments, the burners may be positioned in rows substantially perpendicular to the longitudinal axis (in the melt flow direction) of the melter. In certain embodiments, the burners may be positioned to emit combustion products into molten glass in a melting zone of the melter in a fashion so that the gases penetrate the melt generally perpendicularly to the floor. In other embodiments, one or more burners may emit combustion products into the melt at an angle to the floor, as taught in Applicant's co-pending U.S. patent application Ser. No. 12/817,754 (now U.S. Pat. No. 8,769,992, issued Jul. 8, 2014).

Submerged combustion melters useful in systems and methods in accordance with the present disclosure may also comprise one or more wall-mounted submerged combustion burners, and/or one or more roof-mounted burners. Roof-mounted burners may be useful to pre-heat the melting zone of the melter, and may serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover.

In certain embodiments, all submerged combustion burners are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, in forehearths, and so on. Burners may be flush-mounted with the melter floor in certain embodiments. In other embodiments, such as disclosed in the '583 patent, a portion of one or more of the burners may extend slightly into the melt above the melter floor.

The total quantities of fuel and oxidant used by the combustion system may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure. The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question.

In certain embodiments, melter side walls may have a free-flowing form, devoid of angles. In certain other embodiments, side walls may be configured so that an intermediate location may comprise an intermediate region of the melter having constant width, extending from a first trapezoidal region to the beginning of a narrowing melting region. Other embodiments of suitable melters are described in the above-mentioned 992 patent.

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels may be cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the melt temperature), carbon dioxide, or mixtures thereof with nitrogen. Heat transfer fluids may be compositions comprising both gas and liquid phases, such as the higher chlorofluorocarbons.

Glass-contact refractory linings may be used to reduce wear of refractory in the melter. Glass-contact refractory linings may be 3 inches, 4 inches, 5 inches or more (8 cm, 10 cm, or 13 cm or more) in thickness, however, greater thickness may entail more expense without resultant greater benefit. The refractory lining may be one or more layers. Glass-contact refractory used in flow channels described herein may be fused cast materials based on AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material is dictated among other parameters by the geometry of the melter and the type of glass being produced.

Those having ordinary skill in this art will appreciate that there are many possible variations of the melter, burners, drain conduits, drain channels, and other components described herein, and will be able to devise alternatives and improvements to those embodiments described herein that are nevertheless considered to be within the claims of the present patent.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, paragraph F unless "means for" is explicitly recited together with an associated function. "Means for" clauses are intended to cover the structures, materials, and/or acts described herein as performing the recited function and not only structural equivalents, but also equivalent structures.

What is claimed is:

1. A submerged combustion glass manufacturing system comprising:
   a melter comprising a floor, a roof, a wall structure connecting the floor and roof;
   one or more submerged combustion burners mounted in the floor, roof and/or wall structure, the submerged combustion burners configured to discharge combustion products including water vapor under a level of material being melted in the melter and create turbulent conditions in substantially all of the material;
   one or more of the floor, roof, and wall structure comprising fluid-cooled refractory material and an optional metallic external shell, the fluid-cooled refractory material comprising one or more coolant passages; and
   one or more drain conduits configured to drain at least some water condensed from the water vapor from one or more regions of refractory material substantially saturated with the water away from the melter.

2. The system of claim 1 comprising one or more other drain conduits configured to drain at least some of the water away from at least one substantially concentric burner holder supporting one or more of the submerged combustion burners.

3. The system of claim 2 wherein at least one of the drain conduits comprise a manually operated valve.

4. The system of claim 2 wherein at least one of the drain conduits comprise an automatically operated valve.

5. The system of claim 1 wherein at least a portion of the melter floor is sloped to be non-horizontal and form one or more low points in the melter floor where water condensate can form said one or more regions of refractory material substantially saturated with the water, and wherein at least one of the drain conduits is configured to drain said water condensate from said one or more low points away from the melter.

6. The system of claim 5 wherein one or more burners is positioned at corresponding one or more low points and supported by corresponding one or more substantially concentric burner holders, one or more of the burner holders comprising drain conduits.

7. A submerged combustion glass manufacturing system comprising:
   a melter comprising a floor, a roof, a wall structure connecting the floor and roof;
   one or more submerged combustion burners mounted in the floor, roof and/or wall structure, the submerged combustion burners configured to discharge combustion products including water vapor under a level of material being melted in the melter and create turbulent conditions in substantially all of the material, the burners supported by one or more substantially concentric burner holders;
   one or more of the floor, roof, and wall structure comprising fluid-cooled refractory material and an optional metallic external shell, the fluid-cooled refractory material comprising one or more coolant passages; and
   one or more drain conduits configured to drain at least some water condensed from the water vapor from the one or more substantially concentric burner holders away from the burner holder.

8. The system of claim 7 comprising one or more other drain conduits configured to drain at least some of the water away from one or more regions of refractory material substantially saturated with water.

9. The system of claim 8 wherein at least one of the drain conduits comprise a manually operated valve.

10. The system of claim 8 comprising wherein at least one of the drain conduits comprise an automatically operated valve.

11. The system of claim 8 wherein at least a portion of the melter floor is sloped to be non-horizontal and form one or more low points in the floor where water condensate can form said one or more regions of refractory material substantially saturated with water, and wherein at least one of the drain conduits is configured to drain said water condensate away from the melter.

12. The system of claim 11 wherein one or more burners is positioned at corresponding one or more low points, and one or more of the substantially concentric burner holders comprise drain conduits to drain water away from the burner holder.

13. A submerged combustion glass manufacturing system comprising:
- a melter comprising a floor, a roof, a wall structure connecting the floor and roof;
- one or more submerged combustion burners mounted in the floor, roof and/or wall structure, the submerged combustion burners configured to discharge combustion products including water vapor under a level of material being melted in the melter and create turbulent conditions in substantially all of the material, the burners supported by one or more substantially concentric burner holders;
- one or more of the floor, roof, and wall structure comprising refractory material and a fluid-cooled external metallic shell, the fluid-cooled external metallic shell comprising one or more coolant passages; and
- one or more drain conduits configured to drain at least some water condensed from the water vapor from one or more regions of refractory material substantially saturated with the water away from the melter.

14. The system of claim 13 comprising one or more other drain conduits configured to drain at least some of the water away from at least one substantially concentric burner holder supporting one or more of the submerged combustion burners.

15. The system of claim 14 wherein at least one of the drain conduits comprise a manually operated valve.

16. The system of claim 14 comprising wherein at least one of the drain conduits comprise an automatically operated valve.

17. The system of claim 13 wherein at least a portion of the melter floor is sloped to be non-horizontal and form one or more low points in the floor where water condensate can form said one or more regions of refractory material substantially saturated with water, and wherein at least one of the drain conduits is configured to drain water from one or more of the low points away from the melter.

18. The system of claim 17 wherein one or more burners is positioned at corresponding one or more low points and supported by corresponding one or more substantially concentric burner holders, one or more of the burner holders comprising drain conduits to drain water away from the burner holder.

19. A submerged combustion glass manufacturing system comprising:
- a melter comprising a floor, a roof, a wall structure connecting the floor and roof;
- one or more submerged combustion burners mounted in the floor, roof and/or wall structure, the submerged combustion burners configured to discharge combustion products including water vapor under a level of material being melted in the melter and create turbulent conditions in substantially all of the material, the burners supported by one or more substantially concentric burner holders;
- one or more of the floor, roof, and wall structure comprising refractory material and a fluid-cooled external metallic shell, the fluid-cooled external metallic shell comprising one or more coolant passages; and
- one or more drain conduits configured to drain at least some of the water condensed from the water vapor away from at least one substantially concentric burner holder supporting one or more of the submerged combustion burners.

20. The system of claim 19 comprising one or more other drain conduits configured to drain at least some water condensed from the water vapor from one or more regions of refractory material substantially saturated with the water away from the melter.

21. The system of claim 20 wherein at least one of the drain conduits comprise a manually operated valve.

22. The system of claim 21 wherein at least one of the drain conduits comprise an automatically operated valve.

23. The system of claim 19 wherein at least a portion of the melter floor is sloped to be non-horizontal and form one or more low points in the melter floor where water condensate can form said one or more regions of refractory material substantially saturated with the water, and wherein at least one of the drain conduits is configured to drain said water condensate from said one or more low points away from the melter.

24. The system of claim 23 wherein one or more burners is positioned at corresponding one or more low points and supported by corresponding one or more substantially concentric burner holders, one or more of the burner holders comprising drain conduits.

25. A submerged combustion glass manufacturing method comprising:
- melting glass-forming materials in a submerged combustion melter, the melter comprising a floor, a roof, and a wall structure connecting the floor and roof, one or more of the floor, roof, and wall structure comprising fluid-cooled refractory material and an optional metallic external shell, the fluid-cooled refractory material comprising one or more coolant passages;
- combusting a fuel in one or more submerged combustion burners mounted in the floor, roof, and/or wall structure, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products; and
- draining at least some of the water from the melter.

26. The method of claim 25 wherein the draining occurs by draining at least some of the water from said one or more regions of the fluid-cooled refractory material through one or more conduits fluidly connected thereto.

27. The method of claim 25 wherein the draining occurs by draining at least some of the water from one or more substantially concentric burner holders supporting one or more of said submerged combustion burners through one or more conduits fluidly connected thereto.

28. The method of claim 26 wherein the draining occurs by draining at least some of the water from one or more substantially concentric burner holders supporting one or more of said submerged combustion burners through one or more conduits fluidly connected thereto.

29. The method of claim 25 wherein at least some of the draining occurs manually.

30. The method of claim 25 wherein at least some of the draining occurs automatically.

31. A submerged combustion glass manufacturing method comprising:
- melting glass-forming materials in a submerged combustion melter, the melter comprising a floor, a roof, and a wall structure connecting the floor and roof, one or more of the floor, roof, and wall structure comprising refractory material and a fluid-cooled external metallic shell, the fluid-cooled external metallic shell comprising one or more coolant passages;

combusting a fuel in one or more submerged combustion burners mounted in the floor, roof, and/or wall structure, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products; and draining at least some of the water from the melter.

32. The method of claim 31 wherein the draining occurs by draining at least some of the water from said one or more regions of the fluid-cooled refractory material through one or more conduits fluidly connected thereto.

33. The method of claim 31 wherein the draining occurs by draining at least some of the water from one or more substantially concentric burner holders supporting one or more of said submerged combustion burners through one or more conduits fluidly connected thereto.

34. The method of claim 32 wherein the draining occurs by draining at least some of the water from one or more substantially concentric burner holders supporting one or more of said submerged combustion burners through one or more conduits fluidly connected thereto.

35. The method of claim 31 wherein at least some of the draining occurs manually.

36. The method of claim 31 wherein at least some of the draining occurs automatically.

37. A submerged combustion glass manufacturing system comprising:

a melter comprising a floor, a roof, a wall structure connecting the floor and roof;

one or more submerged combustion burners mounted in the floor, roof and/or wall structure, the submerged combustion burners configured to discharge combustion products including water vapor under a level of material being melted in the melter and create turbulent conditions in substantially all of the material, the burners supported by one or more substantially concentric burner holders;

one or more of the floor, roof, and wall structure comprising refractory material and a fluid-cooled external metallic shell, the fluid-cooled external metallic shell comprising one or more coolant passages; and a clear sight glass and drain conduit configured with at least two valves to allow monitoring of water between at least one the burners and burner holders and periodically drain at least some of the water condensed from the water vapor away from at least one substantially concentric burner holder supporting one or more of the submerged combustion burners.

38. A submerged combustion glass manufacturing method comprising:

melting glass-forming materials in a submerged combustion melter, the melter comprising a floor, a roof, and a wall structure connecting the floor and roof, one or more of the floor, roof, and wall structure comprising refractory material and a fluid-cooled external metallic shell, the fluid-cooled external metallic shell comprising one or more coolant passages;

combusting a fuel in one or more submerged combustion burners mounted in the floor, roof, and/or wall structure in burner holders, the submerged combustion burners discharging combustion products including water vapor under a level of the glass-forming material being melted in the melter and creating turbulent conditions in substantially all of the material, one or more regions of the fluid-cooled refractory material becoming substantially saturated with water from condensed water vapor from combustion products;

monitoring water accumulation between at least one of the submerged combustion burners and its corresponding burner holder using a clear sight glass and drain conduit configured with at least two valves; and periodically draining at least some of the water condensed from the water vapor away from at least one corresponding burner holder supporting the at least one of the submerged combustion burners using the drain conduit.

\* \* \* \* \*